No. 724,182. PATENTED MAR. 31, 1903.
H. L. HEWITT.
GRAIN CRADLE.
APPLICATION FILED JAN. 27, 1902.
NO MODEL.

WITNESSES:
W. R. Bushong
T. E. Bryant

INVENTOR.
Horace L. Hewitt
BY
V. H. Lockwood
ATTORNEY.

THE NORRIS PETERS CO., PHOTO-LITHO., WASHINGTON, D. C.

UNITED STATES PATENT OFFICE.

HORACE L. HEWITT, OF INDIANAPOLIS, INDIANA.

GRAIN-CRADLE.

SPECIFICATION forming part of Letters Patent No. 724,182, dated March 31, 1903.

Application filed January 27, 1902. Serial No. 91,384. (No model.)

*To all whom it may concern:*

Be it known that I, HORACE L. HEWITT, of Indianapolis, county of Marion, and State of Indiana, have invented a certain new and useful Grain-Cradle; and I do hereby declare that the following is a full, clear, and exact description thereof, reference being had to the accompanying drawings, in which like figures refer to like parts.

This invention relates to improvements in the grain-cradle shown and described in Letters Patent of the United States granted to me July 29, 1889, No. 396,743. The nature of said improvement will appear from the accompanying drawings and the following description and claim.

Figure 1:
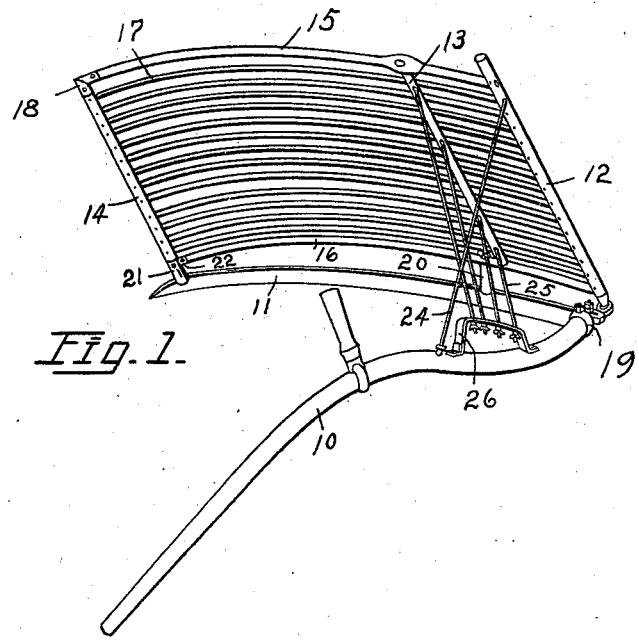
Figure 2:
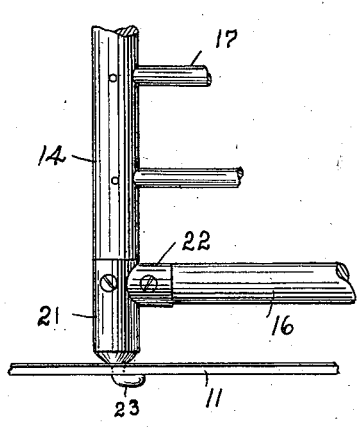
Figure 3:
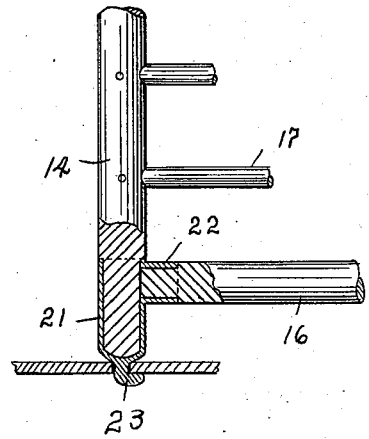

In the drawings, Figure 1 is a perspective view of the grain-cradle containing my improvement. Fig. 2 is a side elevation of a portion of said grain-cradle, showing the connection between the cradle-head and the forward end of the scythe, parts being broken away. Fig. 3 is the same as Fig. 2 with parts in vertical longitudinal section.

In detail, 10 represents the snath, and 11 the scythe, and the cradle-head is formed of an inner bar 12, an intermediate bar 13, a forward bar 14, a top finger 15, a bottom finger 16, and a number of intermediate fingers 17. The fingers are secured to the inner bar 12 by the ends thereof being inserted in holes in said bar. The intermediate bar 13 extends between the top and bottom fingers, with the ends of the same fastened in holes in said fingers. The intermediate fingers extend through said intermediate bar. The intermediate fingers are secured to the forward bar 14, the ends thereof being inserted in holes in said bar. The top finger is secured to said forward bar by an L-shaped tube 18, which receives the ends of the top finger and forward bar 14 and is fastened thereon by nails or screws. The scythe is mounted on the snath by a metal connection 19, substantially the same as that shown in my former patent, No. 396,743. The cradle-head is mounted on the snath and scythe by being secured at three points. At the inner end the bar 12 is secured at its lower end to the metal connection 19, as shown in my former patent. The bottom finger 16 is connected to the scythe by a bolt 20, passing through both bottom finger and scythe, and is the same substantially as that shown in my former patent.

The improvement herein relates to means for connecting the forward end of the cradle-head to the scythe, whereby a very firm connection is made and maintained, and the cradle-head can be readily connected with and separated from the scythe at the forward end when desired. The connection between the cradle-head and the forward end of the scythe needs to be very strong and secure because of the great strain that comes upon such connection in grain-cradles of the type herein shown, having the front bar 14 on the forward end of the fingers. This front bar while the cradle is swung around through the grain receives more strain than any other part of the grain-cradle of this type, and it has been difficult to so firmly secure said forward bar in place as to give it and the cradle-head and the connection with the scythe at the front end the desired strength. To meet the difficulties just referred to, I provide a metal union for connecting the scythe, the forward vertical bar 14, and the bottom finger 16, whereby one will strengthen and reinforce the others. Said connection consists of a metal tube 21, which fits over the lower end of the forward post 14 like a ferrule and is secured thereto by a screw. Extending therefrom at a right angle and integral therewith a tube or ferrule 22 receives the forward end of the bottom finger, and the latter is secured therein by a screw, the forward end of the bottom finger abutting against the vertical bar 14, thus making the union between these two very strong and avoiding the weakness resulting from the union heretofore, which consisted of tapering the forward end of the bottom finger and securing it in a hole made in the vertical bar 14 and which weakened both the bottom finger and said vertical bar materially. There is a downwardly and rearwardly projecting metallic hook 23, integral with the lower end of the tube 21, which is inserted in a hole in the scythe. After the hook 23 has been inserted through the scythe and the inner end of the cradle-head has been secured in place the hook cannot escape. The strain that comes upon the cradle-head when in use tends to hold the hook all the more firmly in the hole in the scythe. The use of the metallic connection formed of the parts 21, 22, and 23 gives to the cradle as a whole great strength and rigidity.

The inner bar 12 is strengthened by the braces 24, running from its upper end to the snath. The middle bar 13 is strengthened by the braces 25, running from the various points to the bracket 26 on the snath.

What is claimed to be my invention, and to be secured by Letters Patent, is—

In a grain-cradle, a scythe having a hole near its forward end, a cradle-head having a forward bar with which the ends of the fingers are connected, a bottom finger, a ferrule provided with a tubular portion surrounding and secured to the lower end of the forward bar and a tubular portion extending therefrom at a right angle surrounding and secured to the forward end of the bottom finger and a hooked extension from the lower end of the ferrule that passes through the hole in the scythe and is turned rearward, and means for securing the inner or rear end of the cradle-head to the scythe.

In witness whereof I have hereunto affixed my signature in the presence of the witnesses herein named.

HORACE L. HEWITT.

Witnesses:
FLORENCE E. BRYANT,
V. H. LOCKWOOD.